(12) United States Patent
Hitomi et al.

(10) Patent No.: US 6,492,295 B2
(45) Date of Patent: Dec. 10, 2002

(54) COMPOSITE CATALYST FOR SOLID POLYMER ELECTROLYTE TYPE FUEL CELL AND PROCESSES FOR PRODUCING THE SAME

(75) Inventors: Shuji Hitomi, Kyoto (JP); Naohiro Tsumura, Kyoto (JP); Shunsuke Mizutani, Kyoto (JP)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/808,032

(22) Filed: Mar. 15, 2001

(65) Prior Publication Data

US 2002/0019308 A1 Feb. 14, 2002

(30) Foreign Application Priority Data

Mar. 15, 2000 (JP) .......................... 2000-072347
Apr. 26, 2000 (JP) .......................... 2000-126636
May 12, 2000 (JP) .......................... 2000-140483

(51) Int. Cl.[7] .......................... B01J 31/00; B01J 21/18; H01M 4/86; B32B 15/02; B28B 5/00
(52) U.S. Cl. .......................... 502/159; 502/101; 502/173; 502/185; 502/439; 429/40; 429/42; 428/407; 264/59; 264/60; 264/61; 264/241; 264/331
(58) Field of Search .............. 429/40, 42; 502/101, 502/159, 173, 185, 439; 428/407; 264/59–61, 241, 331

(56) References Cited

U.S. PATENT DOCUMENTS

| | | | | | |
|---|---|---|---|---|---|
| 3,857,737 | A | * | 12/1974 | Kemp et al. | 136/120 FC |
| 4,044,193 | A | * | 8/1977 | Petrow et al. | 429/40 |
| 4,175,055 | A | * | 11/1979 | Goller et al. | 252/425.3 |
| 4,233,181 | A | * | 11/1980 | Goller et al. | 252/425.3 |
| 4,287,232 | A | * | 9/1981 | Goller et al. | 427/113 |
| 4,568,442 | A | * | 2/1986 | Goldsmith | 204/284 |
| 4,851,377 | A | * | 7/1989 | Breault | 502/101 |
| 5,521,020 | A | * | 5/1996 | Dhar | 429/142 |
| 5,620,807 | A | * | 4/1997 | Mussell et al. | 429/33 |
| 6,344,291 | B1 | * | 2/2002 | Hitomi | 429/42 |

* cited by examiner

Primary Examiner—Mark L. Bell
Assistant Examiner—Patricia L. Hailey
(74) Attorney, Agent, or Firm—Sughrue Mion, PLLC

(57) ABSTRACT

A composite catalyst which comprises a catalyst particle and at least one member selected from the group consisting of a porous or net-form cation-exchange resin and a porous or net-form hydrophobia polymer, wherein the resin and polymer exist on the surface of the catalyst particle.

21 Claims, 16 Drawing Sheets

COMPOSITE CATALYST FOR SOLID POLYMER ELECTROLYTE TYPE FUEL CELL AND PROCESSES FOR PRODUCING THE SAME

FIELD OF THE INVENTION

The present invention relates to a composite catalyst suitable for use in solid polymer electrolyte type fuel cells and to processes for producing the catalyst.

DESCRIPTION OF THE RELATED ART

A solid polymer electrolyte type fuel cell (PEFC) is an apparatus which employs a solid ion-exchange membrane as an electrolyte and in which a fuel (e.g., hydrogen gas) and an oxidizing agent (e.g., oxygen gas) are supplied respectively to the anode and the cathode to electrochemically react these feed materials on the catalyst surfaces, thereby obtaining an electric power.

For example, in the case of using hydrogen gas and oxygen gas as a fuel and an oxidizing agent, respectively, the electrochemical reactions occurring at the electrodes are as follows.

Anode: $H_2 \rightarrow 2H^+ + 2e^-$

Cathode: $1/2O_2 + 2H^+ + 2e^- \rightarrow H_2O$

Overall reaction: $H_2 + 1/2O_2 \rightarrow H_2O$

As the formulae given above show, the reactions at the anode and cathode necessitate the feed of oxygen and hydrogen gases and the transfer of protons ($H^+$) and electrons ($e^-$). Namely, all these reactions proceed only at sites where the feed and transfer are satisfied simultaneously.

An electrode for fuel cells is diagrammatically shown in FIG. 25. This electrode has a catalyst layer 261 and a gas diffusion layer 263. The catalyst layer 261 is constituted, for example, of a mixture of carbon particles supporting catalyst metal 265 and a solid polymer electrolyte 271. The particles 265 and the electrolyte 271 are three-dimensionally distributed so that the layer has pores 267 in inner parts thereof, i.e., is porous. The gas diffusion layer 263 is constituted of a porous electro-conductive material 269, which comprises, e.g., a porous carbon paper. This electrode is bonded to a cation-exchange membrane 275 to thereby fabricate a fuel cell. This gas diffusion layer 263 provides not only to secure passageways for transferring the oxygen gas and hydrogen gas fed externally as reactants to a surface of the catalyst layer 261 but also to provides passageways for discharging the water yielded in the catalyst layer of the cathode from a surface of the catalyst layer 261 to the outside of the cell. On the other hand, in the catalyst layer 261, the carbon supporting catalyst metal 265 forms electro-conductive channels and the solid polymer electrolyte 271 forms proton-conductive channels. The pores 267 function not only as feed channels through which the oxygen or hydrogen gas transferred to a surface of the catalyst layer 261 is supplied to inner parts of the catalyst layer but also as gas diffusion channels for discharging the water yielded in inner parts of the catalyst layer (cathode) to a surface of its layer. These three kinds of channels are three-dimensionally distributed in the catalyst layer 261 to form innumerable sites where gas transfer can occur simultaneously with the transfer of protons ($H^+$) and electrons ($e^-$). Thus, sites for the electrode reactions are provided.

Incidentally, the solid polymer electrolyte 271 comprising a cation-exchange resin used as a proton conductor shows satisfactory proton conductivity only when it is in a hydrous state. Consequently, for preventing the solid polymer electrolyte 271 from drying, a technique is being used in which the gases to be supplied to the anode and cathode are humidified before being supplied. However, this technique has aroused a problem that when the solid polymer electrolyte type fuel cell is operated at a high current density, water floods on the surface of the catalyst layer 261 and in the pores 267 to inhibit gas diffusion, resulting in a considerably reduced output. Especially, this problem is tend to be occurred because the reaction yields water in it.

A technique generally employed for avoiding the water flooding caused by water generation and gas humidification is to impart water repellency to an electrode by incorporating polytetrafluoroethylene (PTFE) particles 273, which exhibits excellent hydrophobic property, together with catalyst particles 265 in the formation of a catalyst layer or by applying PTFE particles 273 to the surface of an porous electro-conductive material 269. However, in order to prevent water flooding enough in the electrode during high-current-density operation, it is necessary to incorporate PTFE particles 273 in an even larger amount to thereby enhance water repellency. Although highly water-repellent, the PTFE particles 273 do not have gas-diffusing properties, not to mention electron conductivity and proton conductivity. Because of this, mixing of large amount of the PTFE particles block electron-conductive channels, proton-conductive channels, and gas diffusion channels, arousing a problem that the output of the fuel cell is reduced rather than increased. In addition, the pores 267 formed among the catalyst particles 265 are partly clogged by the cation-exchange resin and, as a result, the gas diffusion channels are partly blocked to prevent a reactant gas from being supplied to the whole catalyst layer 261 including minute regions thereof. Namely, there has been a problem that the degree of catalyst utilization is low and the fuel cell has a high concentration overvoltage and hence a low cell voltage.

SUMMARY OF THE INVENTION

A first object of the invention is to provide a composite catalyst capable of high electron conductivity, proton conductivity, and gas-diffusing properties while preventing water flooding. A second object of the invention is-to provide gas-diffusing properties while improving proton conductivity by adhering a cation-exchange resin to the surface of a catalyst to thereby improve the degree of catalyst utilization.

The invention provides a composite catalyst characterized by comprising catalyst particles and, adherent to the surface thereof, a porous or net-form cation-exchange resin and/or a porous or net-form hydrophobic polymer.

The adhesion of a cation-exchange resin to the surface of catalyst particles improves the proton conductivity of the catalyst surface. Since the porous or net-form cation-exchange resin is adherent to the surface of the catalyst particles so as to leave the catalyst surface partly exposed, reactant gases can reach the surface of the catalyst particles through the pores or net openings of the resin, whereby the degree of catalyst utilization can be improved. The adhesion of a hydrophobic polymer to the surface of catalyst particles is effective in preventing water flooding in an electrode. Furthermore, since the resin or polymer is adherent to the surface of the catalyst Particles so as to leave the catalyst surface partly exposed, electron conductivity, proton conductivity, and gas-diffusing properties can be secured.

In the case of the composite catalyst having both a porous or net-form cation-exchange resin and a porous or net-form hydrophobic polymer which are adherent to the surface of the catalyst particles, it is a matter of course that the effects brought about when the resin and polymer are used alone can be obtained simultaneously. Furthermore, in the invention, the catalyst particles preferably have a porous or net-form cation-exchange resin adherent to the surface thereof and further have a hydrophobic polymer adherent thereto in the pores or net openings of the cation-exchange resin so as to leave the surface of the catalyst particles partly exposed. Consequently, this hydrophobic polymer is in close contact with the cation-exchange resin and the catalyst particles. This promotes to form site where transfer of protons ($H^+$) and transfer of electrons ($e^-$) can occur simultaneously, whereby the output of a fuel cell can be further improved.

The composite catalyst of the invention can be produced by a process which comprises the steps of: adhering a solution (a) prepared by dissolving a cation-exchange resin and/or a hydrophobic polymer in a solvent to the surface of catalyst particles; and subsequently undergoing phase separation resulting in removing the solvent from the solution (a). It is preferable that the step of phase separation is occurred by extracting the solvent from solution (a) with solution (b) which is insoluble for the resin or polymer in the solution (a) and is compatible with solvent.

In this process, the solution (a) prepared by dissolving a cation-exchange resin and/or a hydrophobic polymer in a solvent first adheres to the surface of catalyst particles. Thereafter, these catalyst particles are brought into contact with a solution (b) which is insoluble for the resin or polymer and is compatible with the solvent. As a result, the solvent is immediately replace by solution (b) Namely, the resin or polymer molecules coagulate resulting in formation a porous or net-form cation-exchange resin and/or hydrophobic polymer on the surface of catalyst particles.

The present invention relates to:

(1) A composite catalyst which comprises a catalyst particle and at least one member member selected from the group consisting of a porous or net-form cation-exchange resin and a porous or net-form hydrophobic polymer, wherein the resin and polymer exist on the surface of the catalyst particle.

(2) The composite catalyst of (1), wherein the catalyst particle preferably comprises a carbon supporting catalyst metal (i.e., the catalyst particle comprises a carbon particle and a catalyst metal provided thereon).

(3) The composite catalyst of (1), wherein the hydrophobic polymer is a fluoropolymer.

(4) The composite catalyst of (1), wherein the amount of the adherent hydrophobic polymer is from 0.01 to 30 wt % based on the catalyst particle.

(5) The composite catalyst of (1), wherein the amount of the adherent cation-exchange resin is from 1.0 to 100 wt % based on the catalyst particle. 100 wt % based on the catalyst particle.

(6) A process for producing a composite catalyst which comprises the steps of:

adhering a solution (a) prepared by dissolving at least one member selected from the group consisting of a cation-exchange resin and a hydrophobic polymer in a solvent to the surface of a catalyst particle; and subsequently undergoing phase separation resulting in removing the solvent from the solution (a).

(7) The process of (6), wherein the step of phase separation is occurred by extracting the solvent from the solution (a) with an solution (b) which is insoluble for the resin or polymer in the solution (a) and is compatible with the solvent.

(8) A process for producing an electrode for fuel cells which comprises:

adhering a solution (a) prepared by dissolving at least one member selected from the group consisting of a cation-exchange resin and a hydrophobic polymer in a solvent to the surface of a catalyst particle;

subsequently undergoing a phase separation of solution (a) so as to remove the solvent to produce a composite catalyst; and pressing a mixture comprising the composite catalyst to form a catalyst layer.

DETAILED DESCRIPTION OF THE INVENTION

One example of the invention is a composite catalyst which comprises catalyst particles and a porous or net-form cation-exchange resin and/or a porous or net-form hydrophobic polymer, wherein the resin and polymer exist on the surface of the catalyst particles so as to leave the surface partly exposed.

Figure 1:
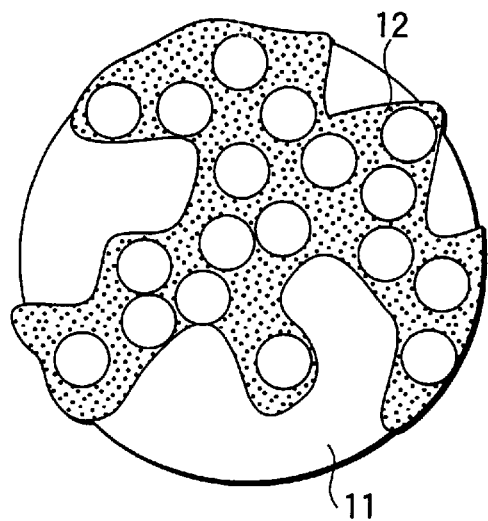
FIG. 1 is a diagrammatic view illustrating a composite catalyst having a hydrophobic polymer adherent thereto.
Figure 2:
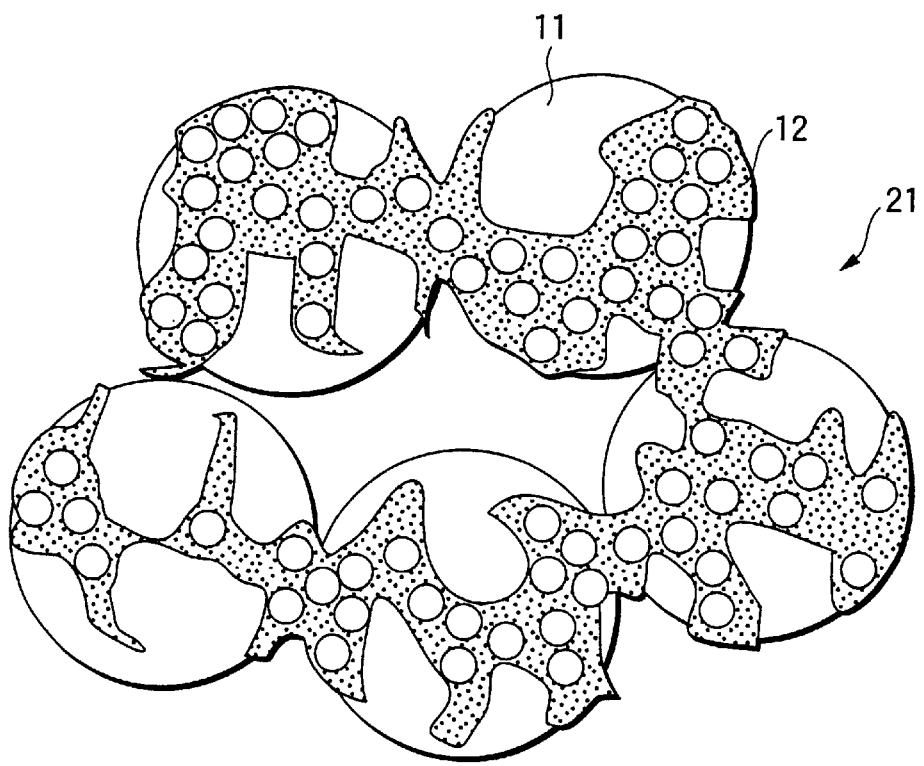
FIG. 2 is a diagrammatic view illustrating a composite catalyst having a hydrophobic polymer adherent thereto.
Figure 3:
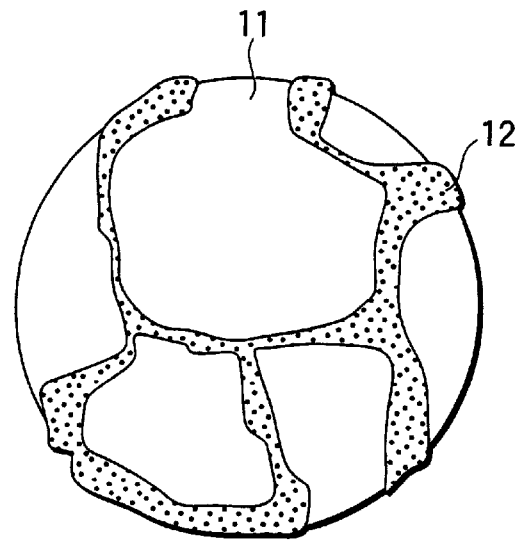
FIG. 3 is a diagrammatic view illustrating a composite catalyst having a hydrophobic polymer adherent thereto.
Figure 4:
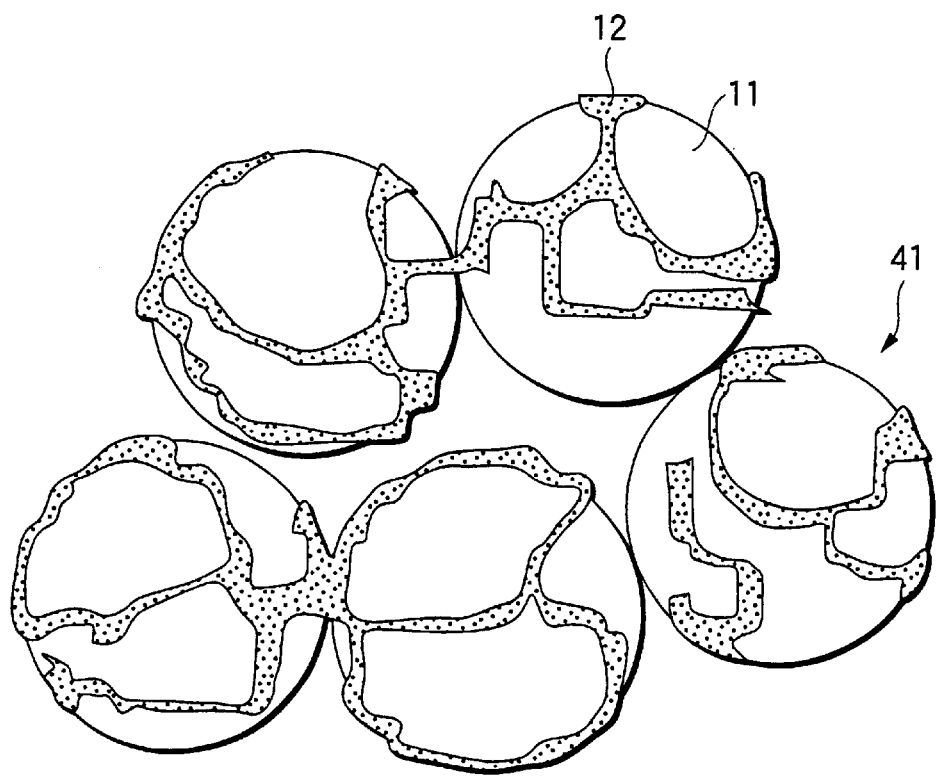
FIG. 4 is a diagrammatic view illustrating an aggregate of composite catalysts having a hydrophobic polymer adherent thereto.
Figure 5:
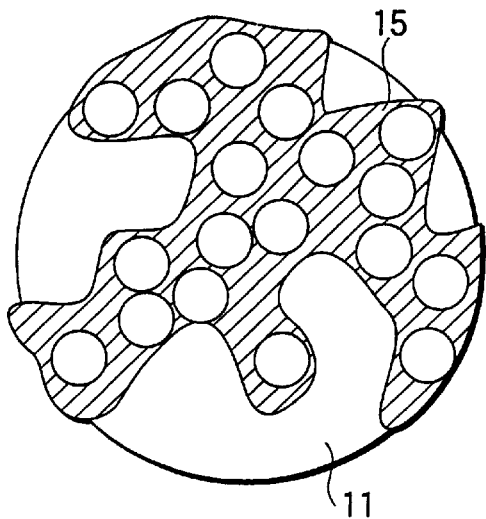
FIG. 5 is a diagrammatic view illustrating a composite catalyst having a cation-exchange resin adherent thereto.
Figure 6:
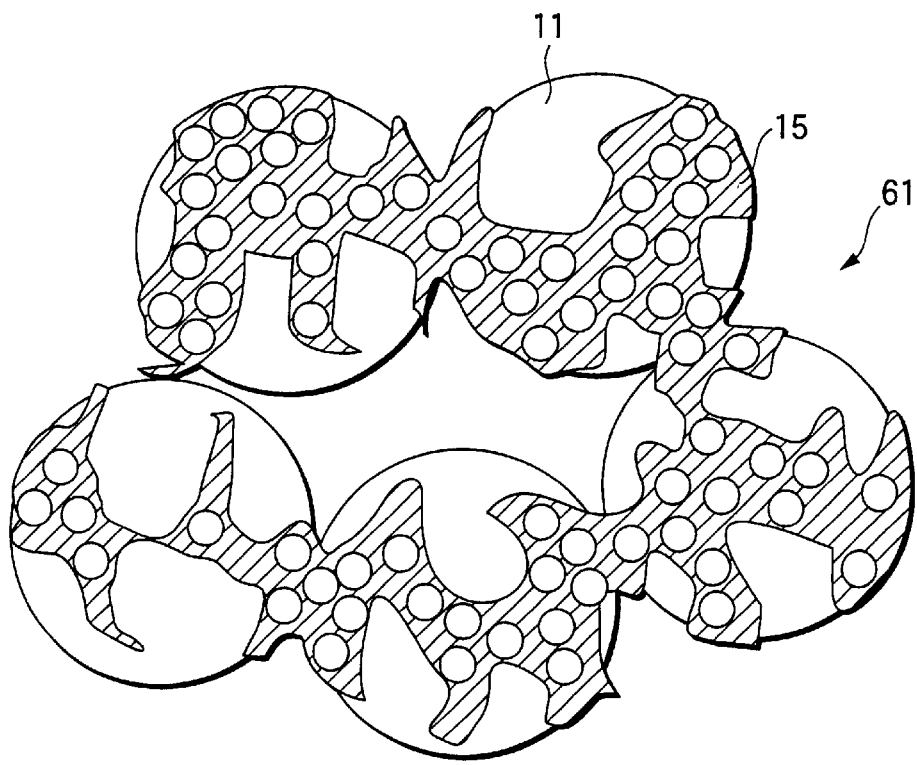
FIG. 6 is a diagrammatic view illustrating an aggregate of composite catalysts having a cation-exchange resin adherent thereto.
Figure 7:
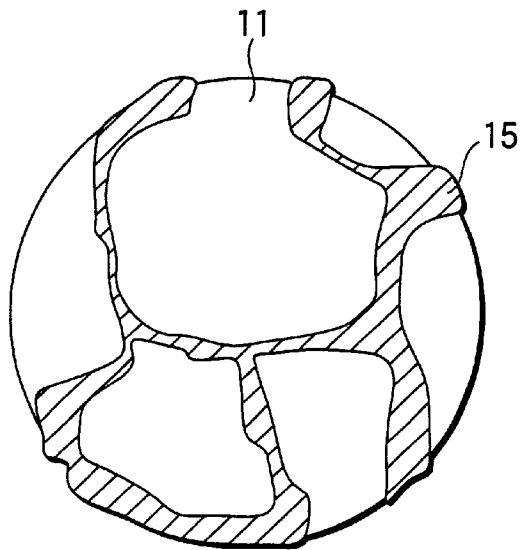
FIG. 7 is a diagrammatic view illustrating a composite catalyst having a cation-exchange resin adherent thereto.
Figure 8:
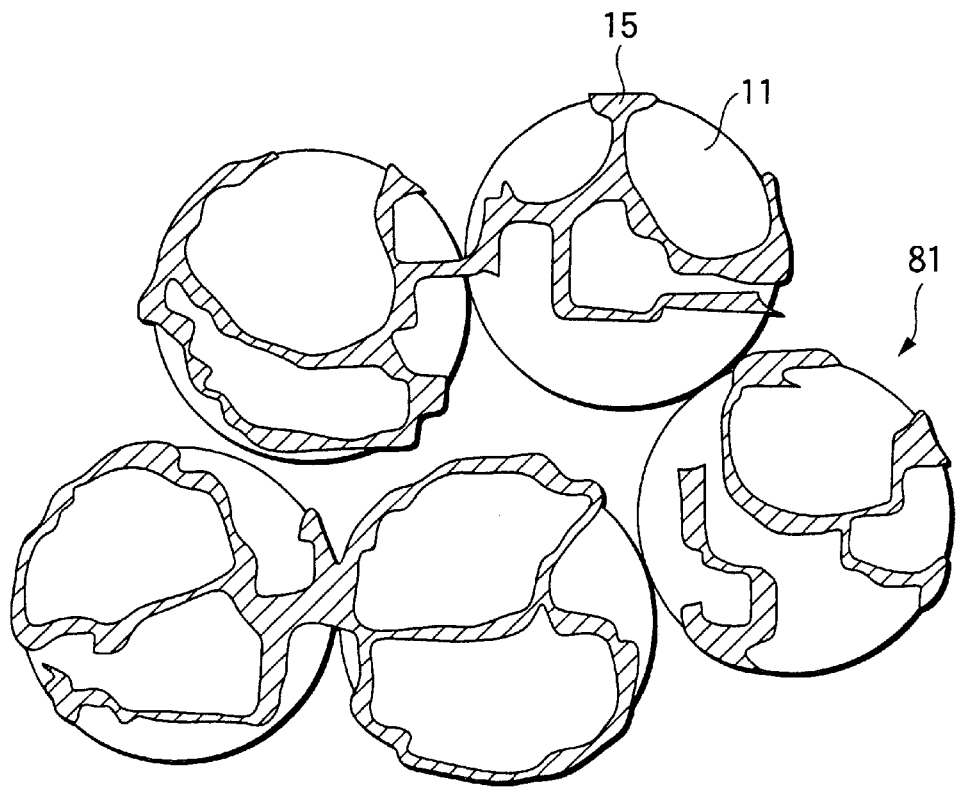
FIG. 8 is a diagrammatic view illustrating an aggregate of composite catalysts having a cation-exchange resin adherent thereto.

FIGS. 1 to 4 are diagrammatic views which illustrate composite catalysts comprising a catalyst particle 11 and a hydrophobic polymer 12 adherent thereto and further illustrate aggregates 21 and 41 made up of such composite catalysts. The hydrophobic polymer 12, which is porous or in a net-form, is adherent to the surface of each catalyst particle 11 so as to leave the surface of the catalyst particle 11 partly exposed. The hydrophobic polymer 12 may be porous as shown in FIGS. 1 and 2 or may be in a net form as shown in FIGS. 3 and 4. There are no particular limitations on the size of the pores or net openings of the polymer 12. The polymer 12 may partly have pores intermingled with net openings. Furthermore, the individual pores or net openings may be three-dimensionally interconnected and interlaced with each other. The aggregates 21 and 41 each is constituted of a large number of such composite catalysts of the invention. Besides being adherent to the surface of each of independent catalyst particles 11, the hydrophobic polymer 12 may have been deposited so as to crosslink adjacent catalyst particles 11.

FIGS. 5 to 8 are diagrammatic views which illustrate composite catalysts comprising a catalyst particle 11 and a cation-exchange resin 15 adherent thereto and further illustrate aggregates 61 and 81 made up of such composite catalysts. The cation-exchange resin 15, which is porous or in a net form, is adherent to the surface of each catalyst particle 11 so as to leave the surface of the catalyst particle 11 partly exposed. The state of the adherent cation-exchange resin 15 may be the same as that of the above mentioned hydrophobic polymer case 12, and an explanation thereon is hence omitted.

Figure 9:
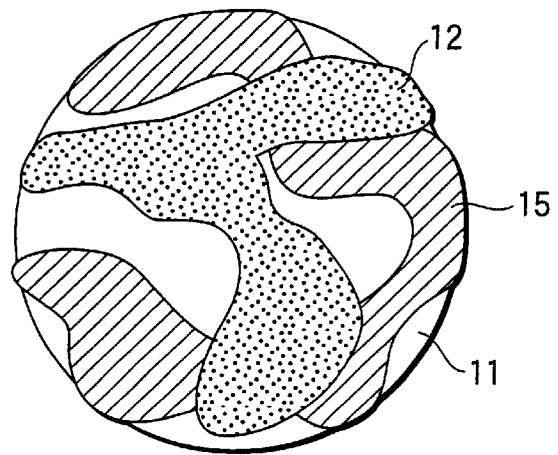
FIG. 9 is a diagrammatic view illustrating a composite catalyst having a hydrophobic polymer and a cation-exchange resin both adherent thereto.
Figure 10:
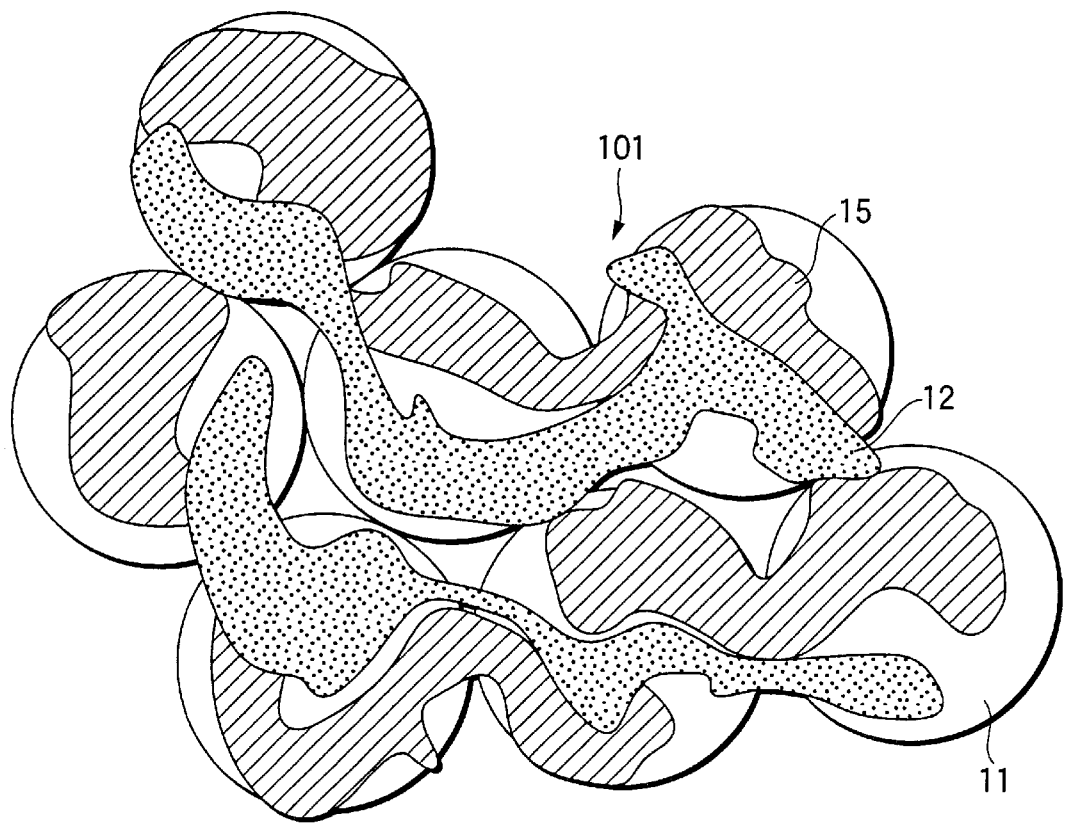
FIG. 10 is a diagrammatic view illustrating an aggregate of composite catalyst having a hydrophobic polymer and a cation-exchange resin both adherent thereto.
Figure 11:
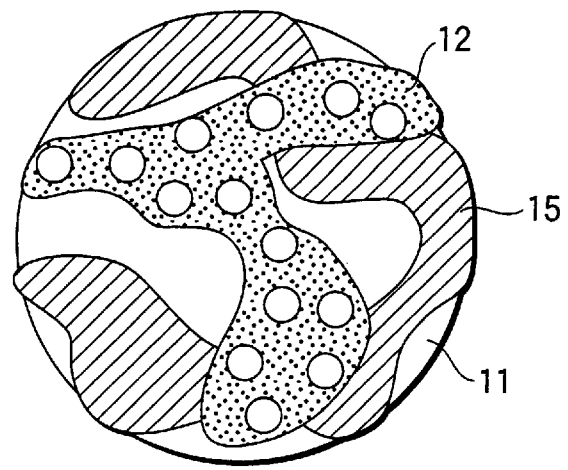
FIG. 11 is a diagrammatic view illustrating a composite catalyst having a hydrophobic polymer and a cation-exchange resin both adherent thereto.
Figure 12:
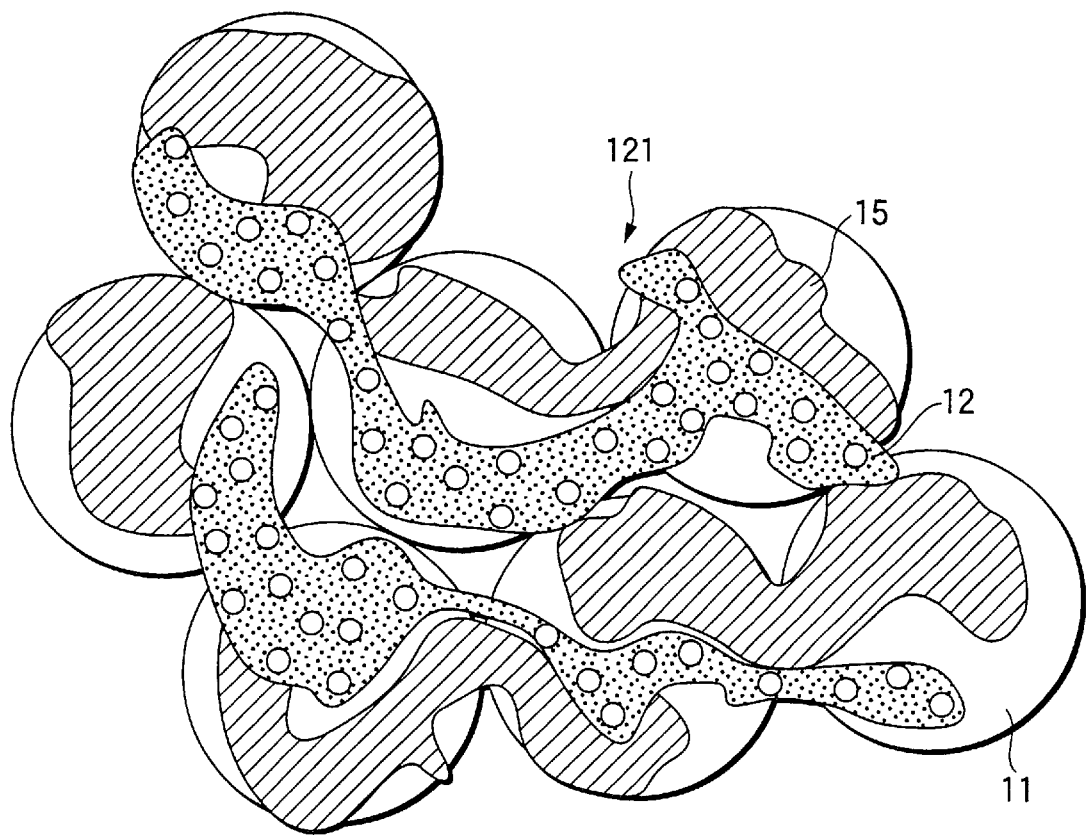
FIG. 12 is a diagrammatic view illustrating a composite catalyst having a hydrophobic polymer and a cation-exchange resin both adherent thereto.
Figure 13:
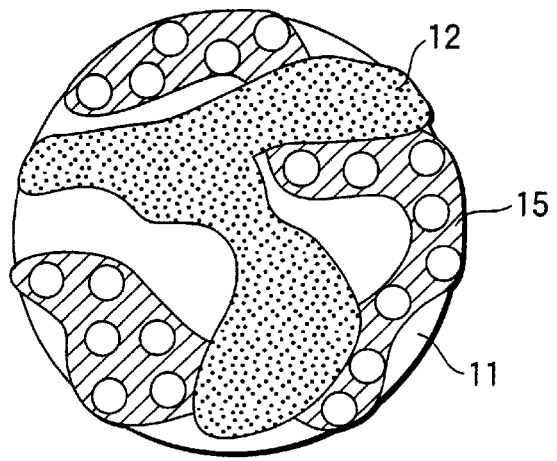
FIG. 13 is a diagrammatic view illustrating a composite catalyst having a hydrophobic polymer and a cation-exchange resin both adherent thereto.
Figure 14:
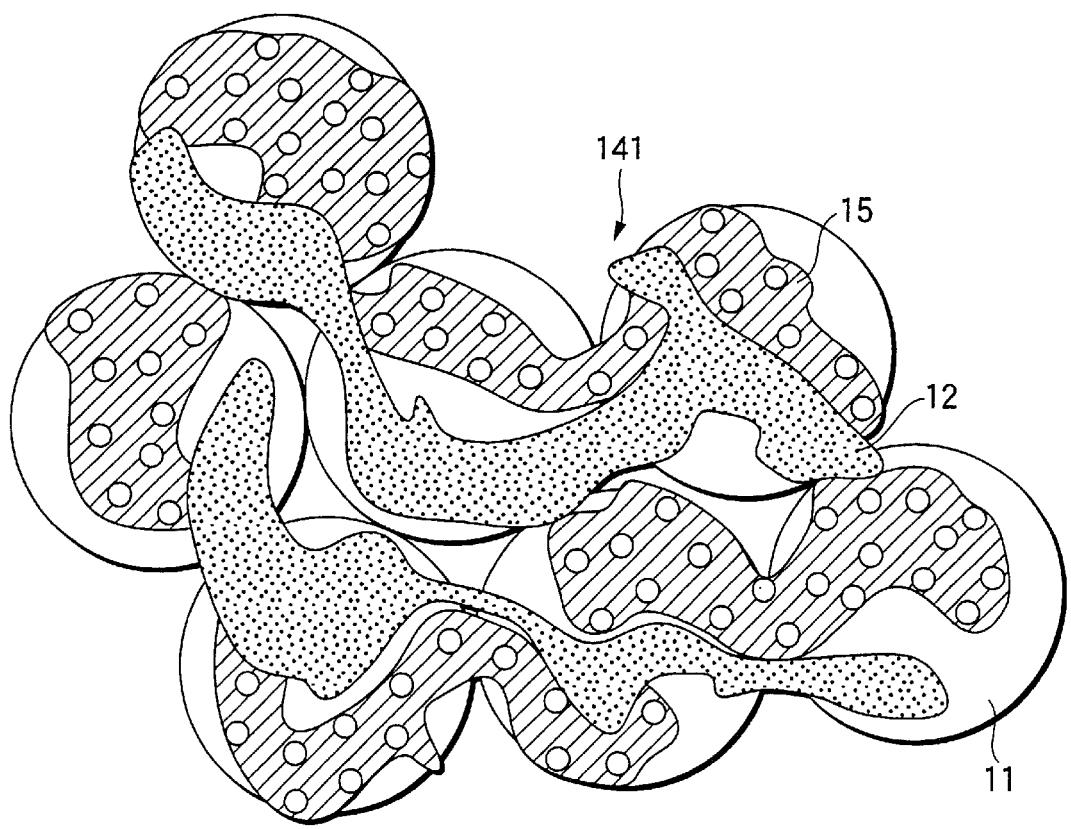
FIG. 14 is a diagrammatic view illustrating an aggregate of composite catalysts having a hydrophobic polymer and a cation-exchange resin both adherent thereto.
Figure 15:
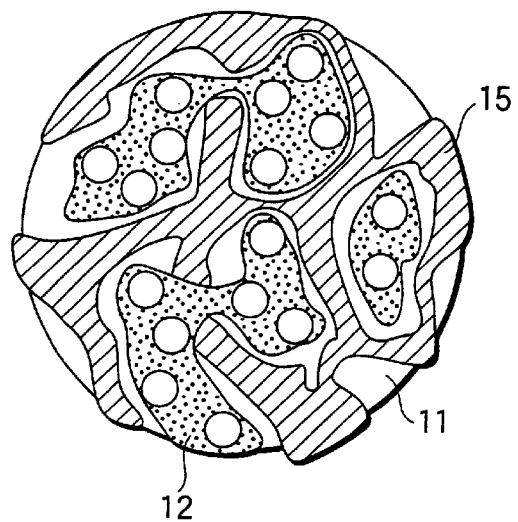
FIG. 15 is a diagrammatic view illustrating a composite catalyst having a hydrophobic polymer and a cation-exchange resin both adherent thereto.
Figure 16:
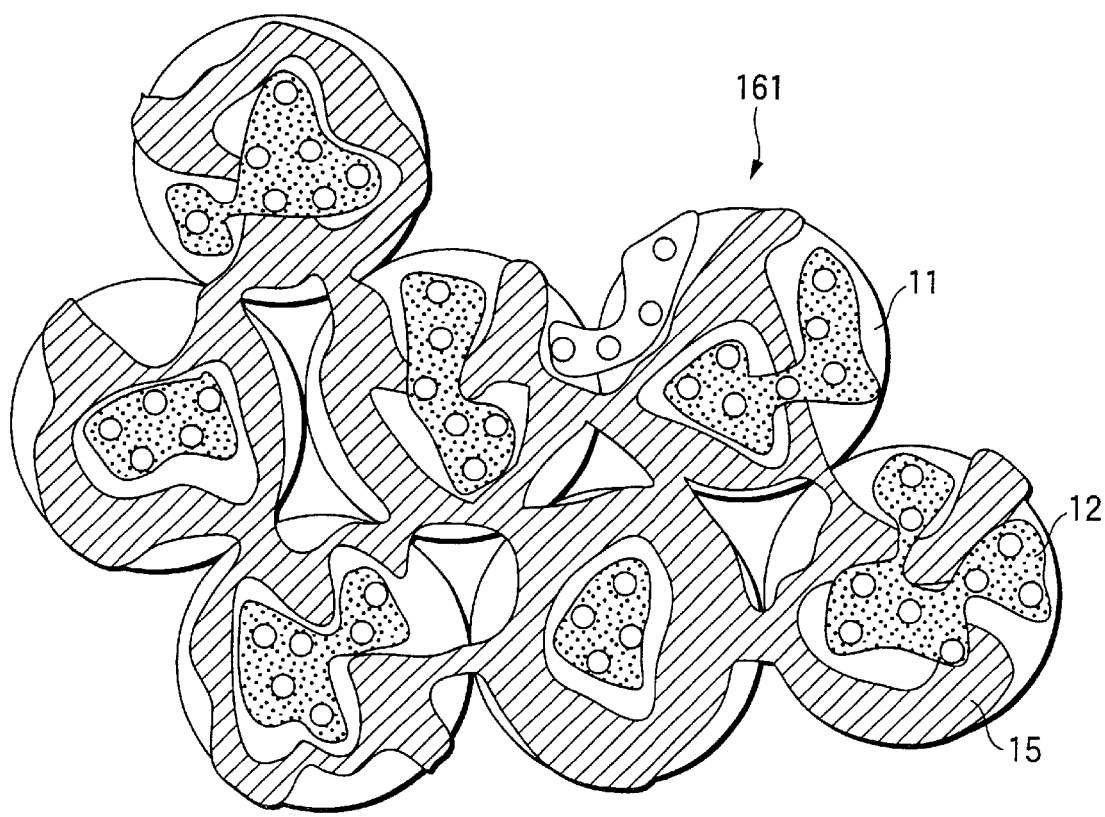
FIG. 16 is a diagrammatic view illustrating an aggregate of composite catalysts having a hydrophobic polymer and a cation-exchange resin both adherent thereto.
Figure 17:
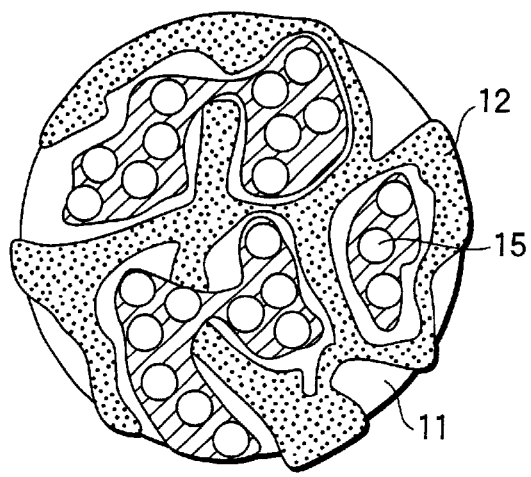
FIG. 17 is a diagrammatic view illustrating a composite catalyst having a hydrophobic polymer and a cation-exchange resin both adherent thereto.
Figure 18:
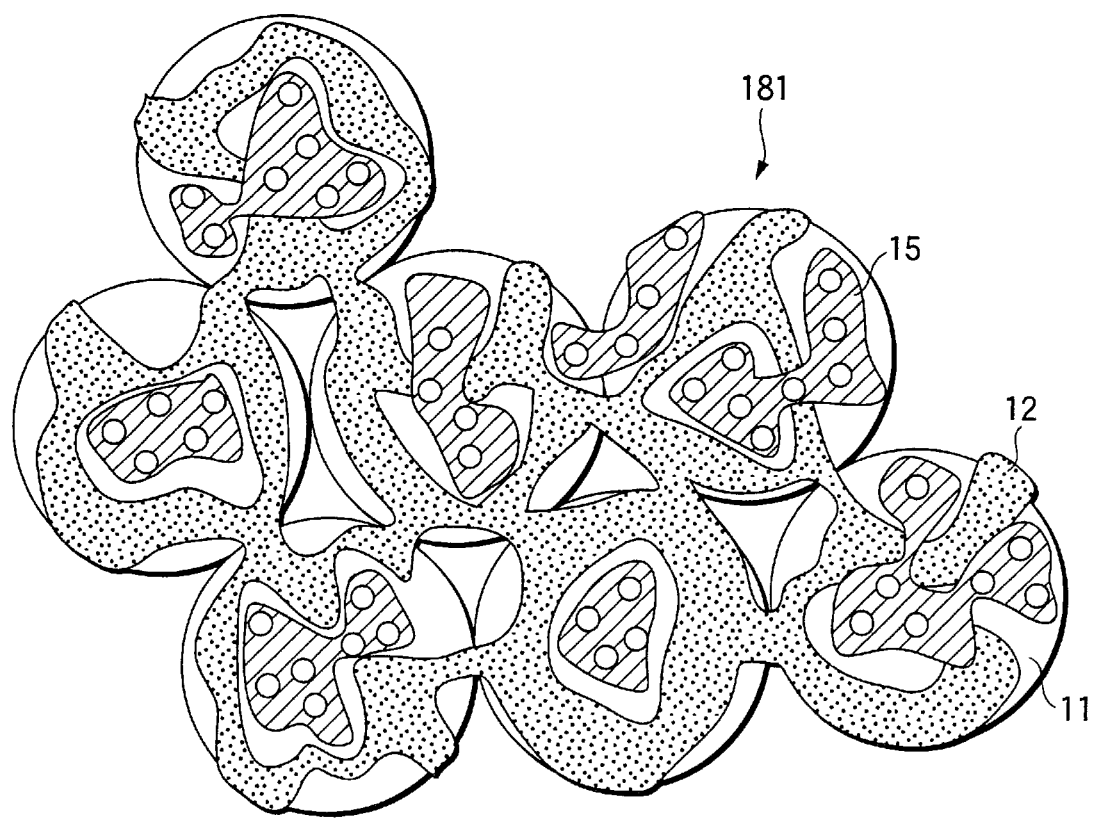
FIG. 18 is a diagrammatic view illustrating an aggregate of composite catalyst having a hydrophobic polymer and a cation-exchange resin both adherent thereto.

Besides being adherent singly to the surface of catalyst particles 11, the hydrophobic polymer 12 and the cation-exchange resin 15 may be simultaneously adherent to the surface of the same catalyst particle(s) 11 as shown in FIGS. 9 to 18. FIGS. 9 and 10 show a composite catalyst comprising a catalyst particle 11 and, adherent thereto, a net-form hydrophobic polymer 12 and a net-form cation-exchange resin 15, and further show an aggregate 101 made up of such composite catalysts. FIGS. 11 to 14 show composite catalysts characterized by having both a hydrophobic polymer 12 and a cation-exchange resin 15, either of which is porous, and further show aggregates 121 and 141 made up of such composite catalysts. FIGS. 15 to 18 show composite catalysts comprising a catalyst particle 11 and, adherent thereto, a net-form hydrophobic polymer 12 and a net-form cation-exchange resin 15, and further show aggregates 161 and 181 made up of such composite catalysts. As described above, a hydrophobic polymer 12 and a cation-exchange resin 15 may be adherent to one or more catalyst particles 11 while interlacing with each other.

In the composite catalysts and aggregates thereof according to the invention shown in FIGS. 1 to 18, catalyst particles having any properties and shape may be employed to produce the desired effects as long as they have a catalytic activity. The catalyst particles may be particles of a catalyst metal for general use in fuel cells, carbon particles supporting catalyst metal supported thereon, etc. Although the catalyst particles can be particles of a catalyst metal such as a platinum-group metal, e.g., platinum, rhodium, ruthenium, iridium, palladium, or osmium, an allay thereof, or the like, it is preferred to use carbon particles supporting such a catalyst metal because this kind of catalyst particles are high in catalytic activity per unit weight of the catalyst metal Preferred examples of the carbon include carbon blacks such as acetylene black and furnace black, graphite particles, and active carbons. However, carbon blacks are especially preferred in that they have excellent electron conductivity and catalyst metals can highly disperse thereon.

The cation-exchange resin 15 is not particularly limited. However, the resin is preferably one having high proton conductivity. Examples thereof include perfluorocarbonsulfonic acid type ion-exchange resins, styrene/divinylbenzene-based sulfonic acid type ion-exchange resins, ion-exchange resin based on sulfonated trifluorostyrene polymers, and sulfonated styrene/butadiene random or block copolymers. Such cation-exchange resins can be used alone or as a mixture of two or more thereof.

The hydrophobic polymer 12 need not have proton conductivity. It is preferably a resin having a contact angle of 75 or larger to water. Examples thereof include polyvinyl chloride, polyacrylonitrile, polyethers such as polyethylene oxide and polypropylene oxide, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethylenimine, polybutadiene, polystyrene, polyisoprene, and derivatives of these. Such polymers may be used alone or as a mixture of two or more thereof. Also usable are resins formed by copolymerizing two or more of the various monomers for constituting those polymers. It is, however, preferred to use a highly water-repellent fluoropolymer, examples of which include fluorinated homopolymers such as polychlorotrifluoroethylene (PCTFE), polyvinylidene fluoride (PVdF), and polyvinyl fluoride (PVF) and fluorinated copolymers such as ethylene/tetrafluoro ethylene copolymers (ETFE), etylene tetrafluoride-propylene /hexafluoride copolymers (EPE), vinylidene fluoride/hexafluoropropylene copolymers (P(VdF-HFP)), and vinylidene fluoride/tetrafluoroethylene copolymers (P(VdF-TFE)). These fluoropolymers may be used also as a mixture of two or more thereof.

In the composite catalysts shown as examples in FIGS. 1 to 18, the proportion by weight of the cation-exchange resin 15 to the catalyst particles 11 is not particularly limited. However, it is preferably from 1.0 to 100 wt %. In the case where the catalyst particles 11 are particles of a catalyst metal, that proportion is preferably from 1.0 to 20 wt % because of the large specific gravity of the particles. In the case where the catalyst particles 11 are carbon particles having a catalyst metal supported thereon, that proportion is preferably from 15 to 100 wt % because of the small specific gravity of the particles compared with particles of a catalyst metal.

The relationship between the proportion of the cation-exchange resin 15 to the catalyst particles 11 in a composite catalyst and properties of the catalyst will be explained below by reference to FIGS. 19 and 20, which show sections of composite catalysts.

Figure 19:
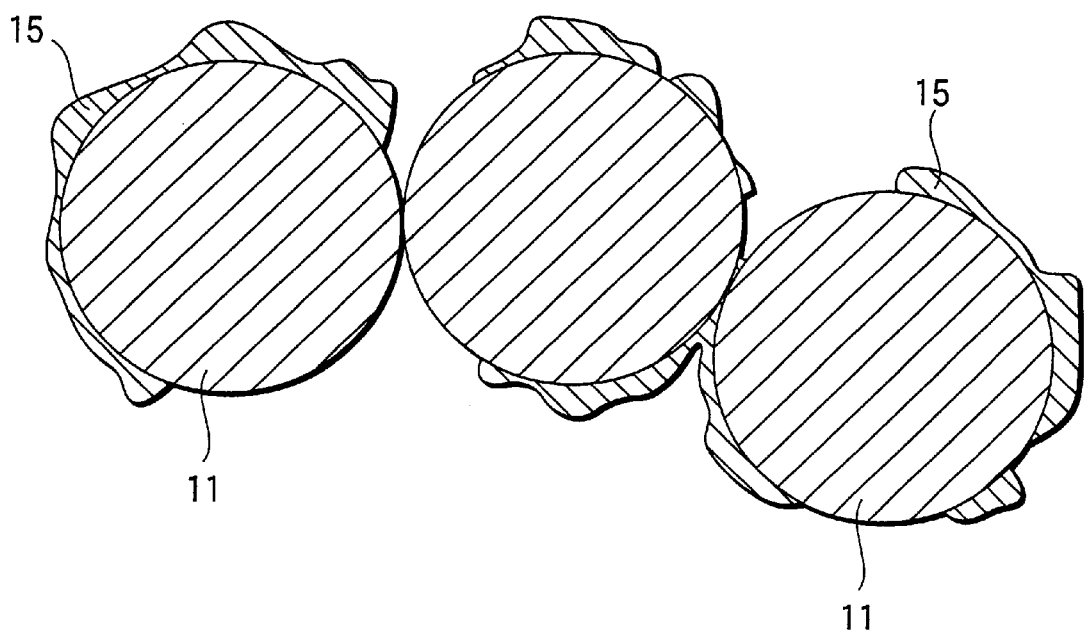
FIG. 19 is a sectional view of a composite catalyst having a cation-exchange resin adherent thereto.
Figure 20:
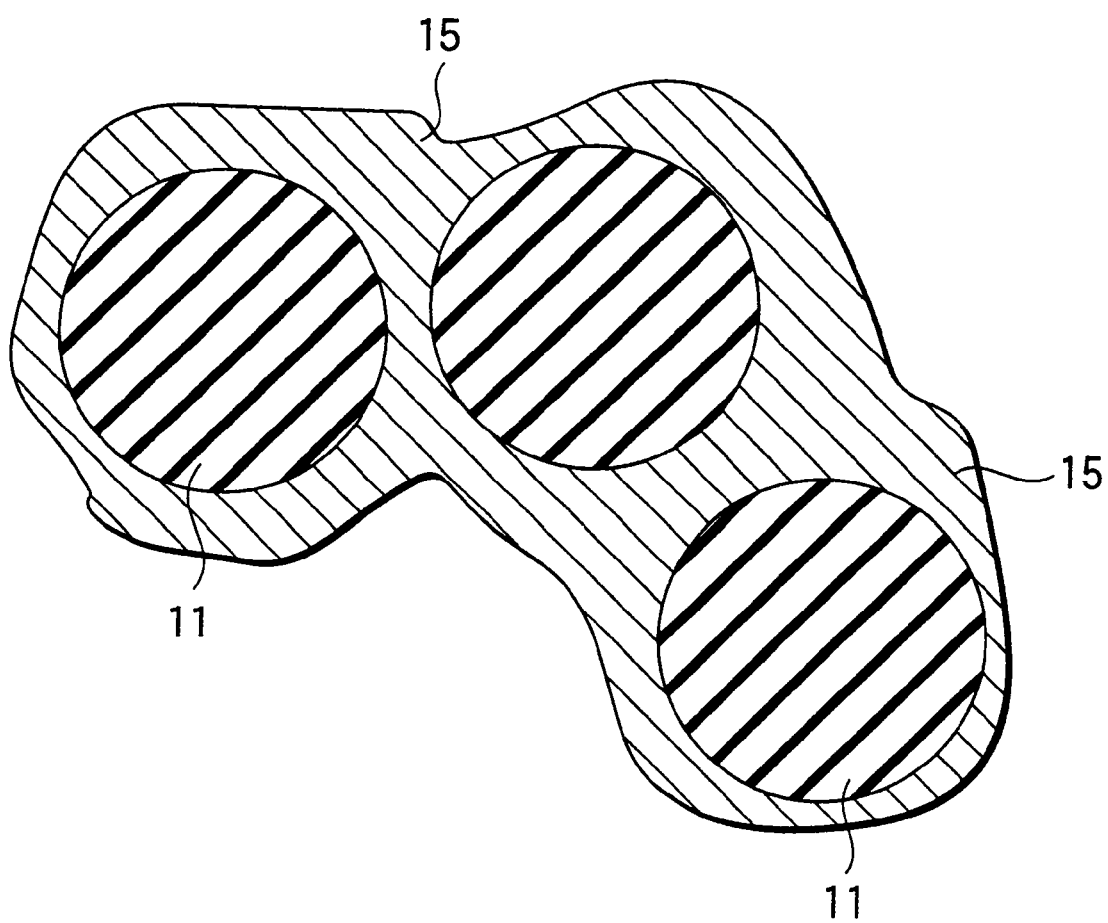
FIG. 20 is a sectional view of a composite catalyst having a cation-exchange resin adherent thereto.

If the proportion by weight of the cation-exchange resin 15 to the catalyst particles 11 is smaller than 1.0 wt % when the catalyst particles 11 are catalyst metal particles or is smaller than 15 wt % when the catalyst particles 11 are catalyst supporting catalyst metal, then the film of the cation-exchange resin 15 has a small surface area as compared with the catalyst particles 11 as shown in FIG. 19. Because of this, a large proportion of the catalyst particles 11 cannot participate in the transfer of protons during electrode reactions, resulting in a considerably reduced degree of catalyst utilization. On the other hand, if that proportion is larger than 20 wt % when the catalyst particles 11 are catalyst metal particles or is larger than 100 wt % when the catalyst particles 11 are catalyst metal-supporting carbon particles, then the distance between the catalyst particles 11 is exceedingly long due to the thick layer of the cation-exchange resin 15 deposited on the catalyst surface, as shown in FIG. 20. Because of this, a large proportion of the catalyst metal cannot participate in the transfer of electrons during electrode reactions, resulting in a considerably reduced degree of catalyst utilization.

With respect to the hydrophobic polymer 12, the proportion thereof to the catalyst particles 11 is preferably from 0.01 to 30 wt %, more preferably from 0.01 to 15 wt %. The hydrophobic polymer 12 does not have gas-diffusing properties, not to mention electron conductivity and proton conductivity. Because of this, if the hydrophobic polymer 12 is adhered in an amount larger than 30 wt % based on the catalyst particle supporting catalyst metal, the polymer blocks electron-conductive channels, proton-conductive channels, and gas diffusion channels to reduce, rather than increase, the output of the fuel cell On the other hand, if the proportion of the hydrophobic polymer 12 is smaller than 0.01 wt %, sufficient water repellency cannot be obtained. Still another reason for the limitation on the proportion of the hydrophobic polymer 12 is that since the polymer 12 serves also as a binder for the catalyst particles 11, proportions thereof smaller than 0.01 wt % result in an electrode in which the catalyst particles cohere insufficiently.

The proportion by weight of the hydrophobic polymer 12 in a composite catalyst can be determined by dissolving away the hydrophobic polymer 12 only and calculating the proportion using the following equation.

Proportion by weight of hydrophobic polymer (wt %)=(weight of composite catalyst before dissolution)−(weight of composite catalyst after dissolution)/(weight of composite catalyst after dissolution)×100

The proportion by weight of the cation-exchange resin 15 can be calculated in the same manner after the dissolution of the cation-exchange resin 15 only.

Processes for producing the composite catalyst will be explained below.

First, a hydrophobic polymer or a cation-exchange resin is dissolved in a solvent. The solvent in which the hydrophobic polymer is to be dissolved is not particularly limited. Examples thereof include carbonic esters such as propylene carbonate, ethylene carbonate, dimethyl carbonate, diethyl carbonate, and ethyl methyl carbonate, ethers such as dimethyl ether, diethyl ether, ethyl methyl ether, and tetrahydrofuran (THF), ketones such as methyl ethyl ketone (MEK) and acetone, dimethylacetamide, 1-methylpyrrolidinone, N-methylpyrrolidone (NMP), dimethylformamide (DMF), and dimethyl sulfoxide (DMSO). In particular, when a PVdF, P(VdF-HFP), P(VdF-TFE), or the like is used, it is preferred to employ NMP, DMF, or DMSO. The solvent in which the cation-exchange resin is to be dissolved is not particularly limited. However, this solvent is preferably water or a water/alcohol mixed solvent. Preferred examples of the alcohol for use in the mixed solvent include alcohols having number of carbon atoms of 4 or less, such as methanol, 1-propanol, 2-propanol, 1-butanol, and 2-butanol. A mixture of two or more of such alcohols is also usable for the mixed solvent.

Subsequently, the solution (a) prepared by dissolving the hydrophobic polymer or cation-exchange resin in a solvent is adhered to the surface of catalyst particles. The adhesion is accomplished by immersing the catalyst particles in the solution (a) or by applying the solution (a) to the catalyst particles by spraying, etc. The concentration of the solution (a) of the hydrophobic polymer is desirably from 0.5 to 4.0 wt % and that of the solution (a) of the cation-exchange resin is desirably from 1 to 10 wt %. The reasons for this are as follows. By using the concentration of the solution (a) is higher than the lower limit, a sufficient amount of the hydrophobic polymer or cation-exchange resin can be adhered to the surface of the catalyst particles. On the other hand, by using a solution (a) having a concentration lower than the upper limit is used, it is possible to avoid being too high viscosity of the solution (a) to apply the solution (a) to catalyst particles by immersion or spraying.

In the case of using the method in which catalyst particles are immersed in the solution (a), the immersion step is preferably conducted in an atmosphere having a reduced pressure of 50 Torr or lower, more preferably 1 Torr or lower, from the standpoint of infiltrating the solution (a) into surface pores of the catalyst particles or, in the case where the catalyst particles comprise secondary particles, also into pores among the secondary particles. Furthermore, the solution (a) of the hydrophobic polymer or cation-exchange resin is preferably stirred, vibrated, or caused to flow during the immersion step.

Thereafter, the solution (a) adherent to the surface of the catalyst particles is caused to undergo a phase separation resulting in separating the resin or polymer from the solvent, and the solvent is removed. Examples of methods for the removal include a method in which a change in the solubility of the hydrophobic polymer or cation-exchange resin in the solvent is utilized. For example of phase separation, a technique for utilizing a solubility change employs such a combination of a hydrophobic polymer or cation-exchange resin and a solvent that the polymer or resin is less apt to dissolve in the solvent at low temperatures and is apt to dissolve therein at elevated temperatures. Specifically, after a solution (a) prepared by completely dissolving a hydrophobic polymer or cation-exchange resin in a solvent at an elevated temperature is adhered to the surface of a catalyst, the temperature of the adherent solution (a) is rapidly lowered, upon which the solution (a) separates into the hydrophobic polymer or cation-exchange resin and the solvent. Thus, a composite catalyst having a hydrophobic polymer or cation-exchange resin deposited on the surface thereof is obtained. This method utilizing a solubility change is especially suitable in the case where a PVdF, P(VdF-HFP) or P(VdF-TFE), or the like is used as the hydrophobic polymer. In this case, a ketone such as, e.g., MEK or acetone is used as the solvent.

A solvent extraction method can be used as another means for separating and removing the solvent from the solution (a) adherent to the surface of the catalyst particles. In this method, an solution (b) which is insoluble for the cation-exchange resin or hydrophobic polymer and is compatible with the solvent containing the cation-exchange resin or hydrophobic polymer dissolved therein. The solution (b) is brought into contact with the catalyst particles having adherent thereto the solution (a) comprising of the cation-exchange resin or hydrophobic polymer and the solvent, whereby the solvent is extracted from the solution (a) The solution (b) which is compatible with the solvent containing the hydrophobic polymer dissolved therein is preferably water or a water/alcohol mixed solvent because of their inexpensiveness. As the solution (b) which is compatible with the solvent containing the cation-exchange resin dissolved therein can be used an organic solvent having a polar group other than an alcoholic hydroxyl group. Examples thereof include: organic solvents having an alkoxycarbonyl group in the molecule and having a carbon chain with 1 to 7 carbon atoms, such as propyl formate, butyl formate, isobutyl formate, ethyl acetate, propyl acetate, isopropyl acetate, allyl acetate, butyl acetate, isobutyl acetate, pentyl acetate, isopentyl acetate, methyl propionate, ethyl propionate, propyl propionate, methyl acrylate, butyl acrylate, isobutyl acrylate, methyl, butyrate, methyl isobutyrate, ethyl butyrate, ethyl isobutyrate, methyl methacrylate, propyl butyrate, isopropyl isobutyrate, 2-ethoxyethyl acetate, and 2-(2-ethoxyethoxy)ethyl acetate, which may be used alone or as a mixture of two or more thereof; organic solvents having an ether bond in the molecule and having a carbon chain with 3 to 5 carbon atoms, such as dipropyl ether, dibutyl ether, ethylene glycol dimethyl ether, ethylene glycol diethyl ether, tripropylene glycol monomethyl ether, and tetrahydrofuran, which may be used alone or as a mixture of two or more thereof; organic solvents having a carbonyl group in the molecule and having a carbon chain with 4 to 8 carbon atoms, such as methyl butyl ketone, methyl isobutyl ketone, methyl hexyl ketone, and dipropyl ketone, which may be used alone or as a mixture of two or more thereof; organic solvents having an amino group in the molecule and having a carbon chain with 1 to 5 carbon atoms, such as isopropylamine, isobutylamine, t-butylamine, isopentylamine, and diethylamine, which may be used alone or as a mixture of two or more thereof; organic solvents having a carboxyl group in the molecule and having a carbon chain with 1 to 6 carbon atoms, such as propionic acid, valeric acid, caproic acid, and heptanoic acid, which may be used alone or as a mixture of two or more thereof, and combinations of these.

By repeatedly conducting the above-described step of adhering a solution (a) of a cation-exchange resin or hydrophobic polymer to the surface of catalyst particles and the above-described solvent extraction step for separating and removing the solvent from the solution (a), the cation-exchange resin or hydrophobic polymer can be adhered in a given amount. The amount of the resin to be adhered can be controlled also by increasing or reducing the concentration or viscosity of the solution (a) of the cation-exchange resin or hydrophobic polymer. Thus, the cation-exchange resin or hydrophobic polymer is adhered in an amount of from 1.0 to 100 wt % or from 0.01 to 30 wt %, respectively, based on the catalyst particles.

A composite catalyst comprising catalyst particles which have a cation-exchange resin and hydrophobic polymer which are porous or net-form can be also produced through the repeatedly conducting the above-described step.

In the case where the composite catalyst obtained by any of the methods described above has fluoropolymer as the hydrophobic polymer, the catalyst can be subjected to a treatment for replacing non-fluorine atoms bonded to the carbon atoms contained in the fluoropolymer by fluorine atoms. Thus, higher water repellency is obtained. It should, however, be noted that some fluoropolymers, e.g., polytetrafluoroethylene and tetrafluoroethylene/hexafluoropropylena copolymers, are derived from monomers in which all the carbon-bonded non-fluorine atoms in the molecule have been replaced by fluorine atoms. Since these polymers cannot be further fluorinated, they are excluded from examples of the fluoropolymer to be subjected to the fluorination treatment. The fluoropolymer to be subjected to this treatment is a fluoropolymer which contains non-fluorine atoms, e.g., hydrogen or chlorine atoms, in the molecule and can be fluorinated by some method. Preferred examples thereof include fluorinated homopolymers such as trifluorochloroethylene copolymers (PCTFE), vinylidene fluoride copolymers (PVdF), and vinyl fluoride polymers (PVF) and fluorinated copolymers such as ethylene/tetrafluoroethylene copolymers (ETFE), ethylene/trifluorochloroethylene copolymers (ECTFE), vinylidene fluoride/hexafluoropropylene copolymers (P(VdF-HFP)), and vinylidene fluoride/tetrafluoroethylene copolymers (P(VdF-TFP)). The fluoropolymer to be subjected to the fluorination treatment may be a mixture of two or more of such fluoropolymers.

The process of the invention for producing an electrode for fuel cells will be explained next. First, the composite catalyst of the invention is dispersed into a dispersion medium to prepare a paste. This paste is applied to a film of a polymer such as FEP or to an prous electro-conductive substrate such as a carbon paper, and the resultant coating film is dried to obtain a film-form mixture. This film-form mixture preferably has a thickness of about 50 $\mu$m or smaller. Examples of the dispersion medium include water, glycerol, N-methylpyrrolidone, benzene, chloroform, and alcohol such as methanol and ethanol. PTFE particles or particles of a cation-exchange resin or solution of ion-exchange resin may be added to the dispersion medium or paste according to need. Preferred techniques for applying the paste in a film form include screen printing, spraying, and coating with a doctor blade, brush, etc.

The structure obtained by forming a film from the paste on a porous electro-conductive substrate can be used by itself as an electrode. The film-form mixture formed on a polymer film is bonded to a porous electro-conductive substrate such as a carbon paper and then the polymer film peeled away to give an electrode for fuel cells. Alternatively, an electrode for fuel cells may be produced by bonding the film-form mixture to at least one side of a solid polymer electrolyte membrane and then the polymer film peeled away, and further bonding a porous electro-conductive substrate such as, e.g., a carbon paper, as a gas diffusion layer thereto from the outer side of the film form mixture.

In the invention, it is preferred to form a catalyst layer through a step in which the film-form mixture is pressed. The reasons for this are as follows. As a result of the pressing of the mixture, that part of the cation-exchange resin which has blocked electrical contacts between catalyst particles is compressed and partly peels off to partly expose the surface of the catalyst particles. Because of this, the catalyst particles come into contact with one another and electron conductivity between the catalyst particles is improved. The pressure for pressing the film-form mixture is not particularly limited as long as it is sufficient to partly peel off the porous cation-exchange resin which is present between catalyst particles and blocks electrical contacts each other. As long as a pressure of 50 kg/cm$^2$ or higher is used, sufficient electron conductivity can be imparted to the catalyst layer. From the standpoint of producing a highly porous catalyst layer, the pressing pressure is preferably 1,000 kg/cm$^2$ or lower. This pressing step may be conducted at any stage in the process for electrode production. For example, the film-form mixture formed on a polymer film may be pressed at a given pressure either before or after a porous electro-conductive substrate such as a carbon paper is bonded to the film-form mixture. In the case where the film-form mixture if bonded to a solid polymer electrolyte film, the film-form mixture may be pressed either before or after it is bonded to the solid polymer electrolyte membrane.

The invention will be explained below by reference to preferred Examples thereof.

Example 1

P(VdF-HFP) having a HFP content of 5 mol % was dissolved in NMP in such an amount as to result in a concentration of 2 wt % to obtain solution (a). The carbon-supporting platinum (Pt/C)(10V30E, manufactured by Tanaka Kikinzoku K. K.; Valcan XC-72 supporting 30 wt % platinum; average particle diameter of the carbon, 30 nm; average particle diameter of the platinum, 2.4 nm) was immersed in P(VdF-HFP)/NMP solution (a) at a reduced pressure of 1 Torr. Subsequently, the impregnated carbon was filtered to remove the excess PVdF/NMP solution (a) and immediately immersed in water as solution (b) for 10 minutes to obtain a composite catalyst A having a hydrophobic polymer deposited on the surface thereof. In a separate examination, the hydrophobic polymer only was dissolved away from the composite catalyst A with NMP to determine the amount of the hydrophobic polymer adhered. As a result, the amount thereof was found to be about 2 wt % based on the carbon-supporting platinum A paste for catalyst layer formation consisting of 7 g of the composite catalyst A and 72 g of a solution of a cation-exchange resin solution (5 wt % Nafion in a mixture of lower aliphatic alcohol and water manufactured by Aldrich Inc.) was applied to an electrically conductive porous carbon paper (thickness, 0.5 mm) and then dried at 120° C. for 1 hour in a nitrogen atmosphere to obtain an electrode. The platinum was extracted from the electrode with aqua regia and determined by chemical analysis. As a result, the platinum loading amount was found to be about 1.0 mg/cm$^2$.

Furthermore, the electrode was bonded to each side of an ion-exchange membrane (Nafion, manufactured by Du Pont Inc.; film thickness, about 50 μm) with a hot press (130° C.). This assembly was incorporated into a single cell for fuel cells to obtain a cell A.

Example 2

The composite catalyst A obtained in Example 1 was allowed to stand for 120 minutes in a mixed gas atmosphere consisting of 3% fluorine gas and 97% nitrogen gas. Thus, a treatment for partly replacing the non-fluorine atoms bonded to the carbon atoms of P(VdF-HFP) by fluorine atoms was conducted to obtain a composite catalyst B. An electrode was produced and incorporated into a single cell for fuel cells in the same manner as in Example 1, except that the composite catalyst B was used. Thus, a cell B was obtained.

Comparative Example 1

First, a paste was prepared which consisted of 7 g of a carbon-supporting platinum (10V30E, manufactured by Tanaka Kikinzoku K. K.; Valcan XC-72 having 30 wt % platinum supported thereon; average particle diameter of the carbon, 30 nm; average particle diameter of the platinum, 2.4 nm) and 72 g of a solution of a solid polymer electrolyte (5 wt % Nafion in a mixture of lower aliphatic alcohol and water manufactured by Aldrich Inc.). To this paste was added a PTFE particle dispersion (Teflon 30J, manufactured by Du Pont-Mitsui Fluorochemicals Colo., Ltd.; 30 wt % dispersion), water and ethanol. The resultant mixture was sufficiently mixed to obtain a paste for catalyst layer formation. The PTFE particle dispersion was incorporated in an amount of 15 wt % in terms of PTFE amount based on the carbon-supporting platinum. Thereafter, the paste for catalyst layer formation was applied to an electrically conductive porous carbon electrode paper (thickness, 0.5 mm) to which water repellency had been imparted. The coating was dried at 120° C. for 1 hour in a nitrogen atmosphere to obtain an electrode C. The amount of the platinum loaded on the electrode C was measured in the same manner as in Example 1, and was found to be about 1.0 mg/cm$^2$.

The electrode C thus produced was incorporated into a single cell for fuel cells in the same manner as in Example 1 to obtain a cell C.

Figure 21:
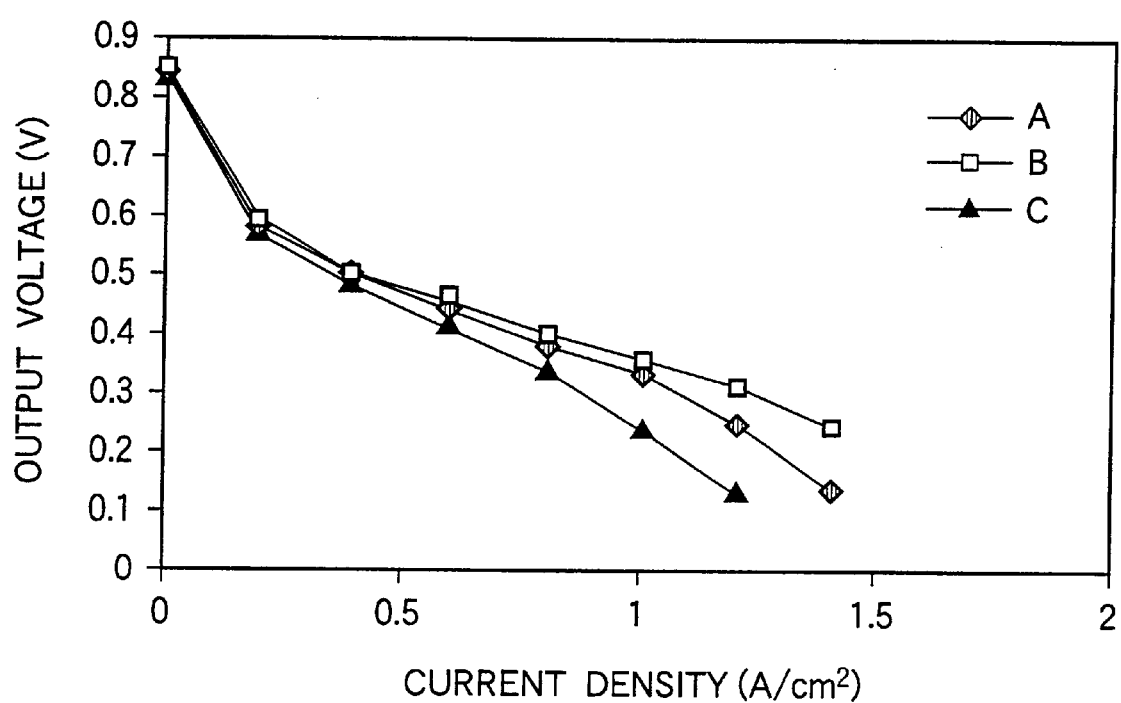
FIG. 21 is a graph showing the current-voltage characteristics of cells A, B, and C.

Those cells A, B, and C were operated using oxygen as a oxidant and hydrogen as fuel gas. The current-voltage characteristics of these cells in this operation are shown in FIG. 21. The operating conditions were as follows. The pressure of each feed gas was 2.5 atm. The feed gases were humidified by bubbling into an 80° C. closed water bath. The cell temperature during the operation was 75° C.

FIG. 21 shows that the cells A and B obtained in Examples 1 and 2 had a higher output voltage at each current density than the cell C obtained in Comparative Example 1. This means that the P(VdF-HFP) was adherent in a net form to the catalyst particles so as to leave the surface of the catalyst particles partly exposed and this state of polymer adhesion secured electron conductivity, proton conductivity, and gas-diffusing properties to thereby enable the fuel cells to have an increased output. In particular, it was found that the cell B, which employed the catalyst B to which enhanced water repellency had been imparted by fluorinating the P(VdF-HFP), had an even higher output than the cell A.

Example 3

The carbon-supporting platinum (Pt/C)(10V30E, manufactured by Tanaka Kikinzoba K. K.; Valcan XC-72 having 30 wt % platinum supported thereon; average particle diameter of the carbon, 30 nm; average particle diameter of the platinum, 2.4 nm) of 7 g was mixed with 30 g of a solution (a) which was consist of a cation-exchange resin solution (5.0 wt % Nafion in a mixture of lower aliphatic alcohol and alcohol manufactured by Aldrich Inc., main solvents are ethanol) of 15 g and ethanol of 15 g. This mixture was filtered to obtain the carbon-supporting platinum having the solution (a) adherent to the surface thereof. Subsequently, this mixture was dipped into a butyl acetate as solution (b) and the resultant mixture was stirred for 1 hour, The particles were then dried to obtain a composite catalyst D consisting of the catalyst particles and the cation-exchange resin deposited on the surface thereof. After this step, the composite catalyst obtained was weighed to determine the amount of the cation-exchange resin adhered (wt %) based on the carbon-supporting platinum. The above-described step for adhering the cation-exchange resin was repeatedly conducted so as to result in cation-exchange resin adhesion amounts of 1, 10, 20, 30, 50, 75, 100, 125, and 150 wt % based on the carbon-supporting platinum.

Using benzene as a dispersion medium, the composite catalysts D obtained above were applied in a film form with PTFE particle dispersion (Teflon 30J, manufactured by Du Pont-Mitsui Fluorochemicals Colo., Ltd.; 30 wt % dispersion) to a polymer film (FEP film). The coatings were dried at 120° C. of nitrogen atmosphere, and the resultant coated polymer films were pressed at a pressure of 870 kg/cm$^2$ at 130° C. to obtain catalyst layers D respectively containing the composite catalysts D according to the invention. The catalyst layers D obtained each was bonded to each side of a solid polymer electrolyte membrane (Nafion, manufactured by Du Pont Inc.; thickness, about 50 µm) with a hot press and then FEP film was peeled away, and a carbon paper was further bonded as a gas diffusion layer on each side. The resultant assemblies were incorporated into single cells for fuel cells to obtain cells D.

The electrodes respectively having the catalyst layers D differing in the amount of the cation-exchange resin adhered were examined for hydrogen adsorption/desorption behavior by cyclic voltammetry technique. Humidified argon and hydrogen gases were introduced at 26° C. at a rate of 30 cc/min each into each electrode of the cells D in which one of the electrodes was used as a working electrode and the other as a reference and counter electrode which also acted as counter electrode. The potential of the working electrode was swept at 50 to 1,000 mV/RHE and 100 mV/sec. During this examination, the cell was operated at 26° C. The potential of the reference electrode based on the potential of the reference electrode in an open circuit was taken as the RHE potential.

Figure 22:
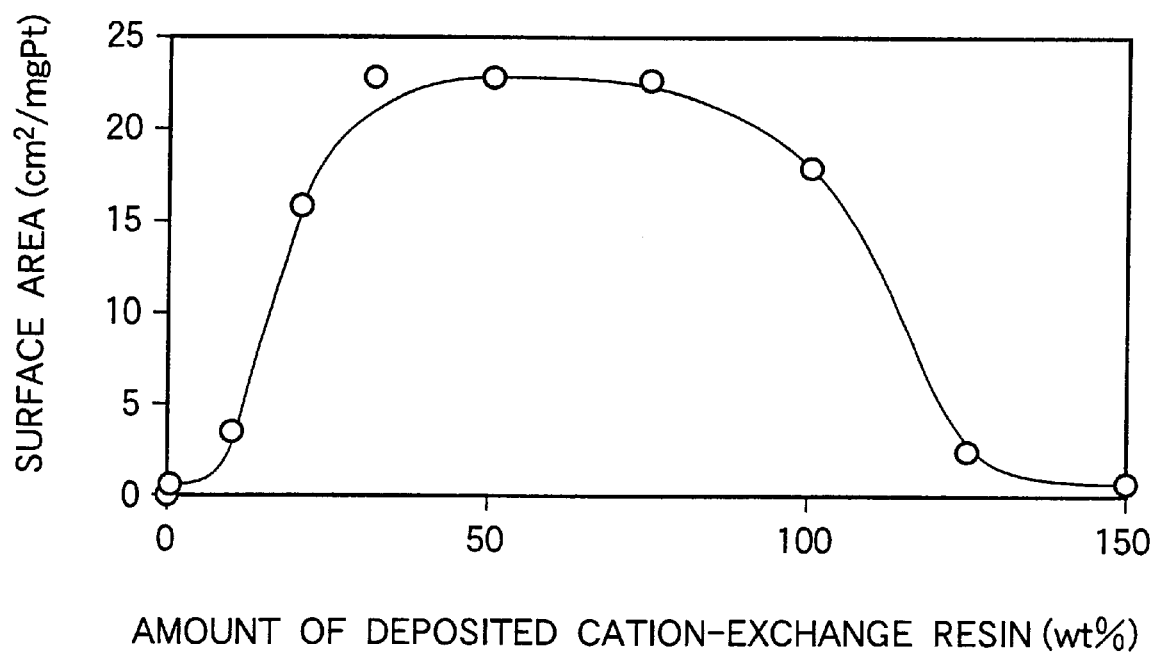
FIG. 22 is a graph showing the relationship between the amount of a cation-exchange resin adhered and the area of active catalyst surface.

The area of the electrochemically active surface per unit amount of loaded platinum for each of the electrodes respectively having the catalyst layers D was calculated from both the amount of coulombic charge for hydrogen desorption obtained on a cyclic voltammogram and the platinum amount determined by a chemical analysis. The relationship between the amount of the cation-exchange resin based on carbon-supporting platinum (wt %) and the area of the electrochemically active surface is shown in FIG. 22. FIG. 22 shows that when the amount of the cation-exchange resin was from 15 to 100 wt % based on the carbon-supporting platinum, the area of the electrochemically active surface per unit amount of loaded platinum was exceedingly large. This indicates that the degree of platinum utilization is exceedingly high when the amount of the cation-exchange resin deposited is in that range.

From an analysis separately conducted, it was ascertained that in the catalyst layer D produced with the composite catalyst having the porous cation-exchange resin in an amount of 30 wt % based on the carbon-supporting platinum, the amount of the loaded platinum was about 1.0 mg/cm$^2$.

Comparative Example 2

The solution of a cation-exchange resin (5.0 wt % Nafion in a mixture of lower aliphatic alcohol and water manufactured by Aldrich Inc.) of 6.0 g was mixed with 1.0 g of carbon-supporting platinum (10V30E, manufactured by Tanaka Kikinzoku K. K.; Valcan XC-72 having 30 wt % platinum supported thereon; average particle diameter of the carbon, 30 nm; average particle diameter of the platinum, 2.4 nm). This mixture was concentrated at 60° C. with stirring until the concentration of the cation-exchange resin reached 10 wt %. Thus, a pasty mixture was obtained which contained the platinum-supporting carbon particles having the 30 wt % cation-exchange resin adherent to the surface thereof. The pasty mixture obtained above was applied in a film form to a polymer film (FEP film), and the solvent was vaporized to dry the coating. The resultant mixture was pressed at a pressure of 870 kg/cm$^2$ to obtain a catalyst layer E. The catalyst layer E obtained was bonded to each side of a solid polymer electrolyte membrane (Nafion, manufactured by Du Pont Inc.; film thickness, about 50 µm) with a hot press, and a carbon paper was further bonded as a gas diffusion layer on each side. The resultant assembly was incorporated into a single cell for fuel cells to obtain a cell E.

From an analysis separately conducted, the amount of the platinum supported on the catalyst layer E was ascertained to be about 1.0 mg/cm$^2$.

Figure 23:
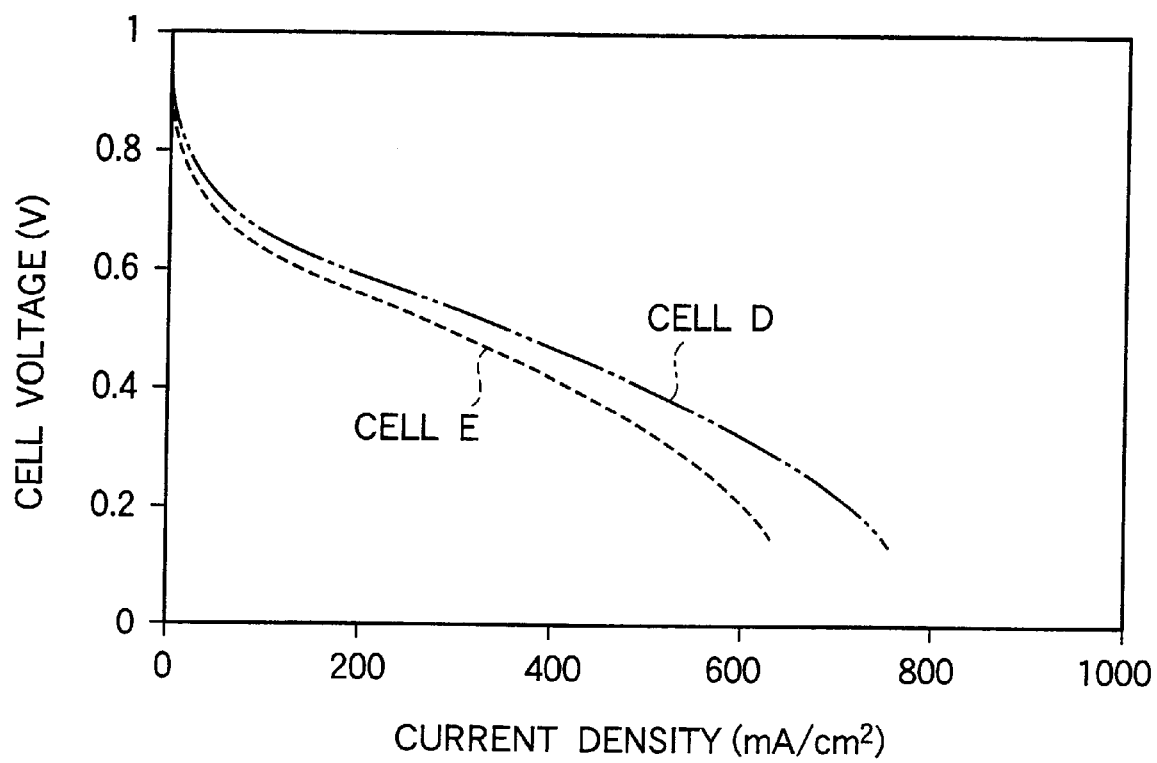
FIG. 23 is a graph showing the current-voltage characteristics of cells D and E.

The cells D produced with the composite catalyst having the porous cation-exchange resin in an amount of 30 wt % based on the carbon-supporting platinum and E were operated using oxygen and hydrogen as feed gases. The current-voltage characteristics thereof in this operation are shown in FIG. 23. The operating conditions used were the same as for the cells A, B, and C. FIG. 23 shows that the cell D obtained in Example 3 according to the invention had a higher output voltage at each current density than the cells E in Comparative Examples 2. This is because in the cell D obtained in Example 3, the catalyst layers had proton-conductive channels, gas diffusion channels, and electron-conductive channels evenly distributed therein.

Example 4

First, carbon-supporting platinum (10V30E, manufactured by Tanaka Kikinzoku K. K.; Valcan XC-72 having 30 wt % platinum supported thereon; average particle diameter of the carbon, 30 nm; average particle diameter of the platinum, 2.4 nm) was immersed at a reduced pressure of 1 Torr or lower in a PVdF-NMP solution (a) of 5 wt % PVdF. Thereafter, the excess PVdF-NMP solution (a) was removed from the mixture by suction filtration, The resultant platinum-supporting carbon particles having the PVDF-NMP solution (a) adherent thereto were immersed in water as solution (b) to extract the NMP Thereafter, the carbon particles were subjected to suction filtration to remove water therefrom and then dried at 100° C. to prepare carbon-supporting platinum whose surface was partly covered with the PvdF in a net form. Subsequently, the carbon-supporting platinum having the net-form PVDF deposited thereon were immersed in a solution (a') of a cation-exchange resin solution (5 wt % Nafion in a mixture of lower aliphatic alcohol and alcohol as solvents manufactured by Aldrich Inc.) in an atmosphere kept at a reduced pressure. From this mixture was removed the excess solution (a') by suction filtration. Thereafter, the platinum-supporting carbon particles were immersed in butyl acetate as solution (b') to extract the solvent, subsequently subjected to suction filtration to remove butyl acetate therefrom, and then dried at room temperature. Thus, a composite catalyst F was obtained which consisted of the catalyst particles having a hydrophobic polymer and cation-exchange resin.

The composite catalyst F with glycerol was applied on FEP film and then dried at 120° C. of nitrogen atmosphere to obtain catalyst layer P. Furthermore, the catalyst layer F was bonded to each side of a cation-exchange resin membrane (Nafion, manufactured by Du Pont Inc.; thickness, 150 pm) by hot pressing (120° C.). Furthermore, a carbon paper was bonded as a gas diffusion layer on each side to obtain a membrane-electrode assembly. The amount of the composite catalyst F to be hot-pressed was regulated so that the membrane-electrode assembly had a loaded-platinum amount of about 1.0 mg/cm². This membrane-electrode assembly F was incorporated into a single cell for fuel cells to obtain a cell F.

Comparative Example 3

First, a paste was prepared by mixing carbon-supporting platinum of 7 g (10V30E, manufactured by Tanaka Kikinzoku K. K.; Valcan XC-72 having 30 wt % platinum supported thereon; average particle diameter of the carbon, 30 nm; average particle diameter of the platinum, 2.4 nm), 70 g of a solution (a) of a cation-exchange resin solution (5 wt % Nafion in a mixture of lower aliphatic alcohol and alcohol as solvents manufactured by Aldrich Inc.), and a PTFE particle dispersion of 1.1 g (Teflon 30J, manufactured by Du Pont-Mitsui Fluorochemicals Co., Ltd.; 30 wt % dispersion). This paste was applied to a carbon papaer, and the coating was allowed to dry at 120° C. of nitrogen atmosphere for about 1 hour to obtain a catalyst layer G. This catalyst layer a was bonded to each side of a solid polymer electrolyte membrane (Nafion, manufactured by Du Pont Inc.; film thickness, 150 μm) with a hot press (95° C.). Thus, a membrane-electrode assembly G was obtained. This assembly G was incorporated into a single cell in the same manner as in Example 4 to obtain a cell I. In the membrane-electrode assembly G, the amount of the supported platinum was about 1.0 mg/cm².

Figure 24:
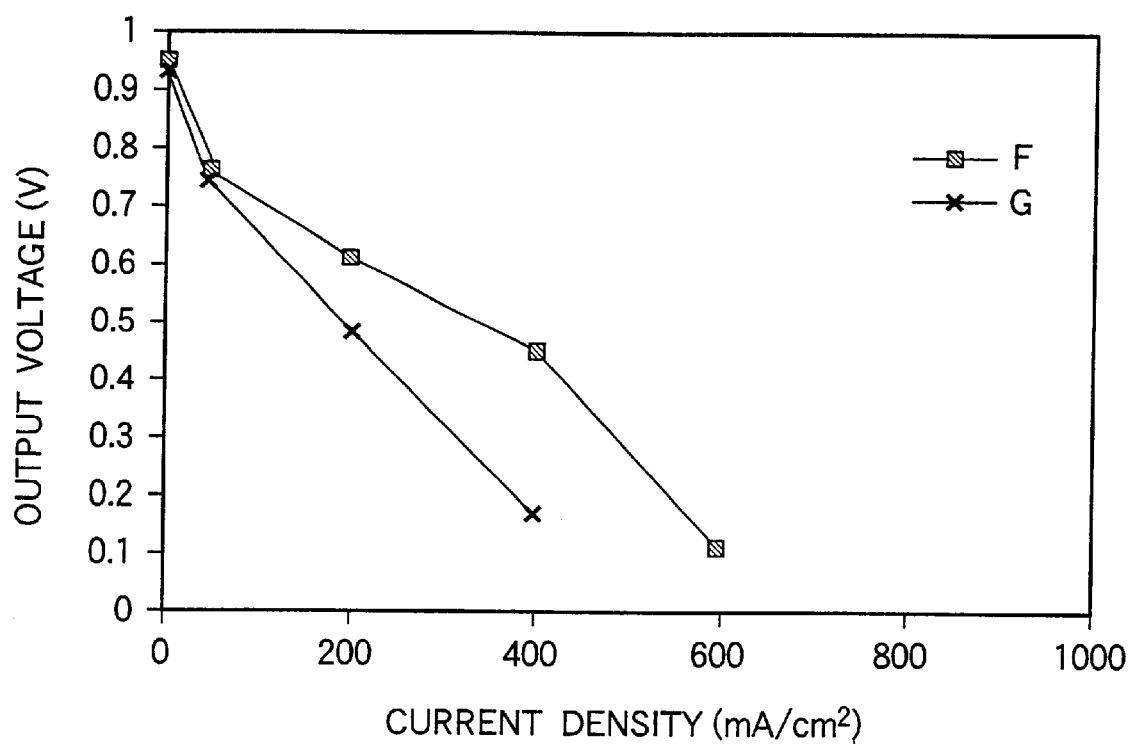
FIG. 24 is a graph showing the current-voltage characteristics of cells F, and G.
Figure 25:
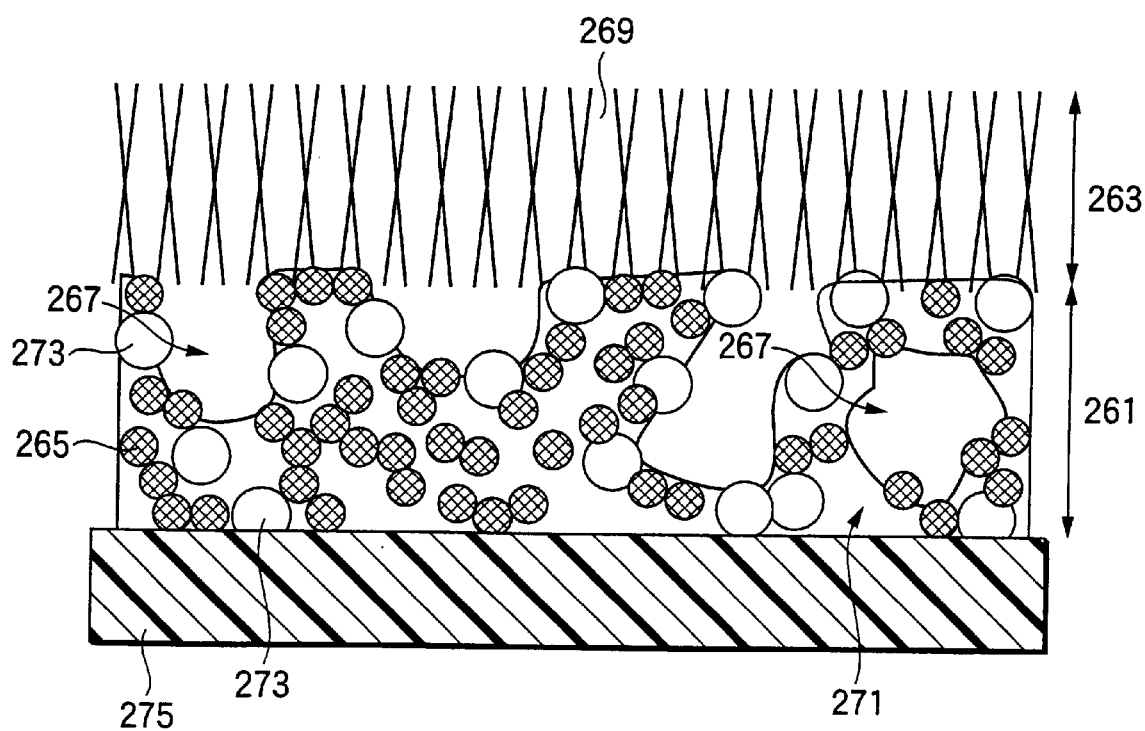
FIG. 25 is a diagrammatic view illustrating a conventional electrode for fuel cells.

The cells F and G were operated using hydrogen and air as an anode-side feed gas and a cathode-side feed gas, respectively, and the current-voltage characteristics thereof in this operation are shown in FIG. 24. The pressure of each feed gas was 1 atm. The feed gases were humidified by bubbling into a 70° C. closed water bath.

As apparent from FIG. 24, the cell F according to the invention had a higher output voltage at each current density than the cell G. The reason for this is as follows. The electrode G contained a large amount of PTFE particles in the catalyst layers and the gas diffusion layers. Because of this, electron-conductive channels and gas diffusion channels in the electrode G had been blocked although it has high water-repellent, resulting in the reduced output. In contrast, the gas diffusion electrodes F, which employed the composite catalysts F for fuel cell according to the invention, were free from water flooding therein and had improved gas-diffusing properties while retaining satisfactory electron conductivity and proton conductivity. Because of this oxygen could be supplied even to inner parts of the pores of the electrodes F resulting in a greatly improved output as compared with the conventional electrode.

While the invention has been described in detail and with reference to specific examples thereof, it will be apparent to one skilled in the art that various changes and modifications can be made therein without departing from the spirit and scope thereof.

This application is based on Japanese Patent application No. 2000-072347 filed on Mar. 15, 2000, Japanese Patent application No. 2000-126636 filed on Apr. 26, 2000 and Japanese Patent application No. 2000-140483 filed on May 12, 2000, the entire contents of which are incorporated hereinto by reference.

What is claimed is:

1. A composite catalyst which comprises a catalyst particle and at least one member selected from the group consisting of a porous or net-form cation-exchange resin and a porous or not-form hydrophobic polymer, wherein the resin and polymer exist on the surface of the catalyst particle.

2. The composite catalyst of claim 1, wherein the catalyst particle comprises a carbon particle and a catalyst metal provided thereon.

3. The composite catalyst of claim 1, wherein the hydrophobic polymer is a fluoropolymer.

4. The composite catalyst of claim 1, wherein the amount of the hydrophobic polymer is from 0.01 to 30 wt % based on the catalyst particle.

5. The composite catalyst of claim 1, wherein the amount of the cation-exchange resin is from 1.0 to 100 wt % based on the catalyst particle.

6. A process for producing a composite catalyst which comprises the steps of:

adhering a solution (a) prepared by dissolving at least one member selected from the group consisting of a cation-exchange resin and a hydrophobic polymer in a solvent to the surface of a catalyst particle; and subsequently undergoing phase separation resulting in removing the solvent from the solution (a).

7. The process of claim 6, wherein the step of phase separation occurs by extracting the solvent from the solution (a) with a solution (b) which is insoluble for the resin or polymer and is compatible with the solvent.

8. The process of claim 6, wherein the catalyst particle comprises a carbon particle and a catalyst metal provided thereon.

9. The process of claim 6, wherein the hydrophobic polymer is a fluoropolymer.

10. The process of claim 9, which further comprises a treatment for replacing a non-fluorine atom bonded to a carbon atom contained in the fluoropolymer by a fluorine atom.

11. A process for producing a composite catalyst which comprises the steps of:

adhering a solution (a) prepared by dissolving a cation-exchange resin in a solvent to the surface of a catalyst particle;

subsequently undergoing phase separation resulting in removing the solvent from the solution (a); and then further adhering a hydrophobic polymer to part of the surface of the catalyst particle.

12. The process of claim 11, wherein the step of phase separation occurs by extracting the solvent from the solution (a) with a solution (b) which is insoluble for the resin in the solution (a) and is compatible with the solvent.

13. The process of claim 11, wherein the catalyst particle comprises a carbon particle and a catalyst metal provided thereon.

14. The process of claim 11, wherein the hydrophobic polymer is a fluoropolymer.

15. The process of claim 14, which further comprises a treatment for replacing a non-fluorine atom bonded to a carbon atom contained in the fluoropolymer by a fluorine atom.

16. A process for producing a composite catalyst which comprises the steps of:

adhering a solution (a) prepared by dissolving a hydrophobic polymer in a solvent to the surface of a catalyst particle;

subsequently undergoing phase separation resulting in removing the solvent from the solution (a); and then further adhering a cation-exchange resin to part of the surface of the catalyst particle.

17. The process of claim 16, wherein the step of phase separation occurs by extracting the solvent from the solution (a) with a solution (b) which is insoluble for the polymer and is compatible with the solvent.

18. The process of claim 16, wherein the catalyst particle comprises a carbon particle and a catalyst metal provided thereon.

19. The process of claim 16, wherein the hydrophobic polymer is a fluoropolymer.

20. The process of claim 19, which further comprises a treatment for replacing a non-fluorine atom bonded to a carbon atom contained in the fluoropolymer by a fluorine atom.

21. A process for producing an electrode for fuel cells which comprises:

adhering a solution (a) prepared by dissolving at least one member selected from the group consisting of a cation-exchange resin and a hydrophobic polymer in a solvent to the surface of a catalyst particle;

subsequently undergoing a phase separation of solution (a) so as to remove the solvent to produce a composite catalyst; and pressing a mixture comprising the composite catalyst to form a catalyst layer.

* * * * *

UNITED STATES PATENT AND TRADEMARK OFFICE
CERTIFICATE OF CORRECTION

PATENT NO. : 6,492,295 B2
DATED : December 10, 2002
INVENTOR(S) : Shuji Hitomi, Naohiro Tsumura and Shunsuke Mizutani It is certified that error appears in the above-identified patent and that said Letters Patent is hereby corrected as shown below:

Column 16,
Line 2, change "not-form" to -- net-form --.

Signed and Sealed this

Thirteenth Day of May, 2003

JAMES E. ROGAN
*Director of the United States Patent and Trademark Office*